Jan. 5, 1926.

L. K. McCLELLAN 1,568,231

ANTISKID CHAIN FOR VEHICLE TIRES

Filed August 22, 1924

Inventor

Lewis K. McClellan

By Bacon & Thomas

Attorneys

Patented Jan. 5, 1926.

1,568,231

UNITED STATES PATENT OFFICE.

LEWIS K. McCLELLAN, OF BELFRY, MONTANA.

ANTISKID CHAIN FOR VEHICLE TIRES.

Application filed August 22, 1924. Serial No. 733,630.

*To all whom it may concern:*

Be it known that I, LEWIS K. MCCLELLAN, a citizen of the United States of America, residing at Belfry, in the county of Carbon and State of Montana, have invented certain new and useful Improvements in Antiskid Chains for Vehicle Tires, of which the following is a specification.

The invention relates to improvements in anti-skid chains for vehicle tires.

It is an object of the invention to provide an anti-skid device which is composed of separable sections that may be added to at any time to permit the device to fit any size tire, and which sections can also be replaced from time to time when destroyed without disrupting the remaining portion of the device.

It is a further object of the invention to provide an anti-skid chain utilizing as side members a series of independent links each carrying a cross chain, which links can be bodily removed to permit the substitution of new ones in their places from time to time and which links can be added to the anti-skid device to permit the same to be used with any size vehicle tire.

In the accompanying drawings.

Figure 1:
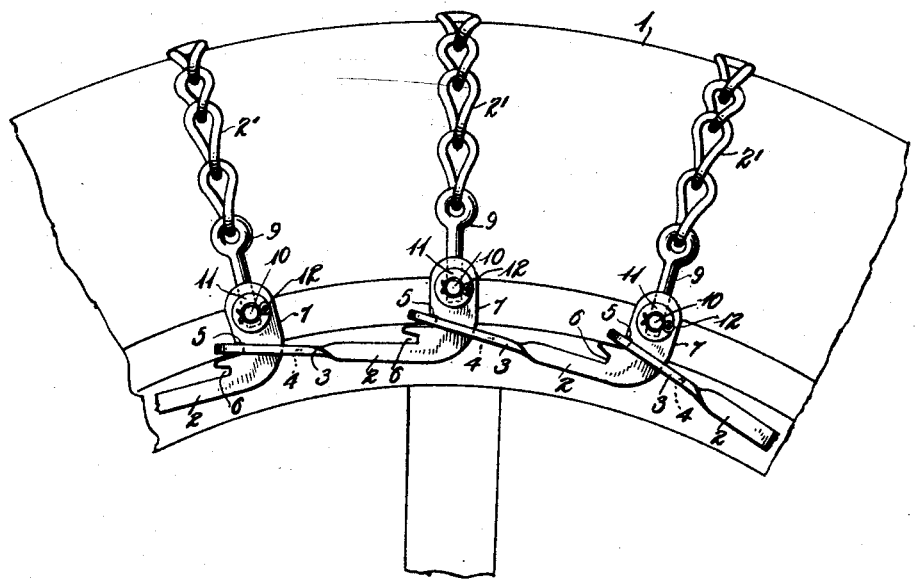
Figure 1 represents a side elevation of a portion of wheel with invention applied.
Figure 2:
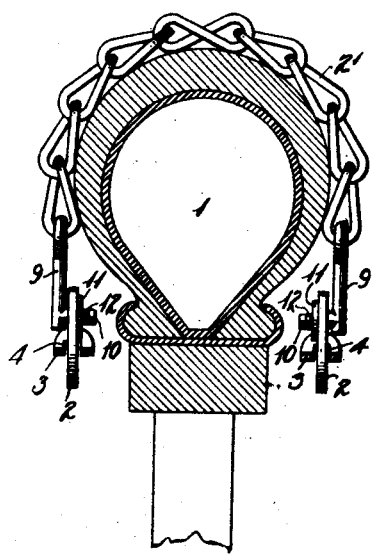
Figure 2 is a transverse sectional view.
Figure 3:
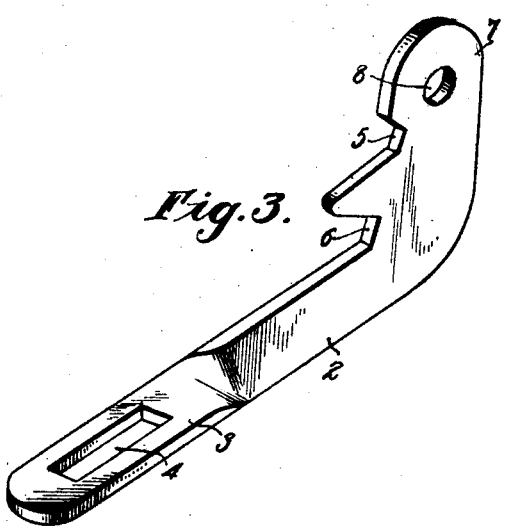
Figure 3 is a perspective view of invention detached.

Referring now more particularly to the drawings, wherein like reference characters indicate corresponding parts, the numeral 1 designates a vehicle tire which can be of any standard or well known type. The anti-skid device is composed of a series of independent sections constructed in the following manner. I provide a series of links 2 which are adapted to be joined together and extend around the sides of the tire. These links merely interlock and are not attached to one another by fastening devices. Each link also carries a cross chain 2' of a construction to be hereinafter described. Inasmuch as each side link is of the same specific construction, a description of one will suffice for all. Each link is composed of a piece of flat metal, of sufficient size to withstand the necessary strains, having a body portion 2 provided with a flat twisted end portion 3 provided with an aperture 4 therein, the opposite end of the link being formed with a pair of notches 5 and 6 which are spaced longitudinally apart, this end of the link being formed with an upwardly bent extension 7 provided with an aperture 8 therein by means of which the anti-skid chains 2 are attached to the various links.

The anti-skid chains 2 are attached to each link by a hook member 9, the same having an offset extension 10 passing through the aperture in the up-turned tread of each link and which offset member 10 is retained in position by a washer 11 and a cotter pin 12. To remove an anti-skid chain it is only necessary to remove the cotter pin and slide the hook section 9 from the link with which it is connected.

In forming the anti-skid device, a series of the links 2 are joined together. The widened end portion 3 of one link is fitted over the up-turned end 7 of an adjacent link, which end passes through the aperture 4, and this widened end portion then seats in one of the notches 5 or 6. Two notches are provided in order to take up the length of a series of links in case the devise may be too loosely applied to the tire, yet sufficient distance is not available to permit an entire link to be removed. After the apertured end 3 is inserted over one of the hook ends 7 of an adjacent link, the cross chains are secured in position by passing the end 10 of one of the hooks 9 thereof through an aperture in the end 7 of a link so that the two removable links cannot become disconnected. The links are interlocked in this manner until an anti-skid chain of sufficient size has been formed, it being apparent that all the links are identical in construction and that they are united to one another in the same manner as described in reference to two adjacent links. If, during the use of the device, one of the anti-skid chains 2' should become worn, then this chain is removed and a new chain substituted in its place without disturbing the remaining links and chains of the device. Furthermore, by merely substituting additional links from time to time as needed, an anti-skid device of this kind can be used on various size cars, permitting for instance, the owner of several sized cars to utilize but one set of anti-skidding devices, which are capable of lengthening or shortening to adapt them for use with the different sized vehicle tires. It is also apparent that the anti-skid chains can be closely drawn down on the tires by fitting the adjacent links in the different notches 5 or 6 which are provided for the purpose of tightening the applied anti-skid device to a tire. It will also be observed that inasmuch as the side chains are not employed there is no possibility of end portions of the side elements striking the fenders during the rotation of the wheels as frequently occurs with the standard type of anti-skid chain where one end of the chain is united to another portion thereof.

Having thus described my invention, what I claim is:

1. An anti-skid device, comprising a series of links adapted to be joined together, each link being constructed of relatively flat material having a hook portion at one end and an aperture at the other, separated notches disposed in said hook of each link, cross chains adapted to be secured to said hook portions above said notches, fastening devices for said cross chains comprising a fastening element adapted to extend through an aperture in each hook member, and means for holding said fastening member in position.

2. An anti-skid device comprising a series of interlocking links adapted to extend around the sides of a vehicle tire, each link having an aperture at one end, and a hook portion at the other end, the hook portion of one link being adapted to pass through the aperture of an adjacent link to unite said links together, and cross chains connected to the hook portion of each link and extending over the tread of the tire.

3. An anti-skid device for vehicle tires comprising a series of links adapted to be detachably interlocked, each link being provided at one end with an aperture, and at its opposite end with a hook portion, separated notches in said links adjacent said hook portions, the hook portion of one link being adapted to pass through the aperture of an adjacent link to rest in one of said notches, and cross chains connected with the hook portion of each link.

In testimony whereof I affix my signature.

LEWIS K. McCLELLAN.